INVENTORS
EDWARD R. BLANCHARD
SYDNEY H. REITER

ATTORNEY

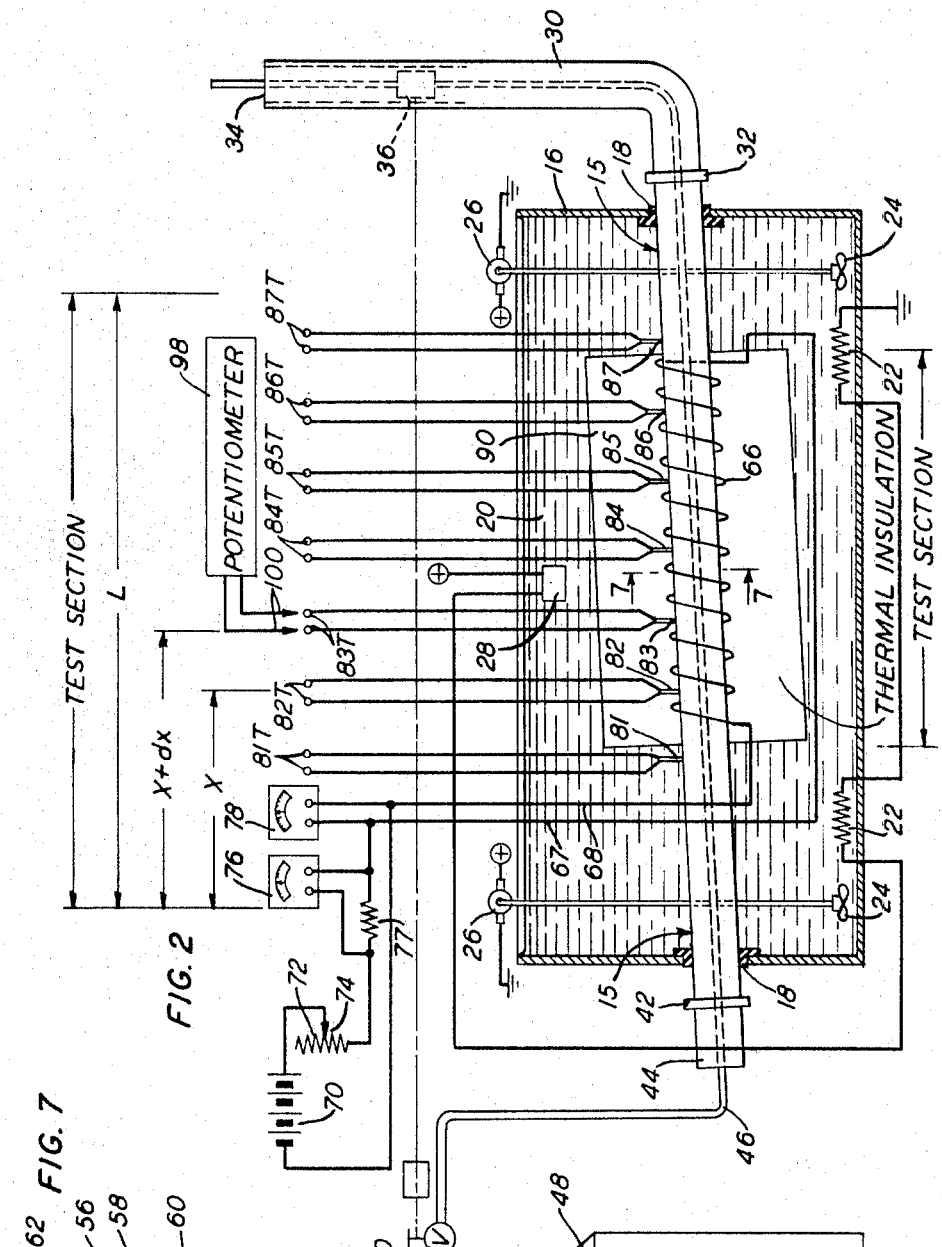

United States Patent Office 3,453,865
Patented July 8, 1969

3,453,865
**HEAT LEAK MEASURING DEVICE
AND METHOD**
Edward R. Blanchard, Summit, and Sydney H. Reiter,
Mountainside, N.J., assignors to Air Reduction Company, Incorporated, New York, N.Y., a corporation of
New York
Filed Aug. 23, 1965, Ser. No. 481,866
Int. Cl. G01n 25/00
U.S. Cl. 73—15                                      9 Claims

ABSTRACT OF THE DISCLOSURE

This invention relates to an apparatus and method for determining heat leakage into a cryogenic vessel in which a portion of the exterior of the vessel is placed in a constant temperature environment, the interior of said vessel is also maintained at a low temperature with cryogenic liquid, insulating material is utilized to insulate the exterior of the vessel from the external environment, a heating mechanism supplies known quantities of energy to the external surface of the vessel to regulate its temperature so that it is maintained at the temperature of the external environment, the quantity of energy supply to maintain this temperature being substantially equal to the rate of heat leakage into the vessel.

---

This invention relates to a method and apparatus for determining the heat leakage through the thermal insulation means of cryogenic containers or vessels, such as pipes. The invention will be described in connection with double walled pipes, but this is illustrative and it will be understood that the invention applies to heat-insulated vessels generally.

More specifically, the invention will be described in connection with double walled pipes having insulation means between the inner and outer walls but this is illustrative and it will be understood that the invention applies, for example, generally to heat insulated vessels of the type having a structure consisting of a rigid outer shell and an inner vessel located approximately concentrically in the space enclosed by the outer shell but not filling all of that space. Insulation means consisting of a powder, or a foam, or a fibrous material, or so called laminar insulation, or a high degree of vacuum, or combinations of these may be provided in the space between the outer shell and the inner vessel. Also included in the insulation means may be measures and devices for reducing the conduction of heat through necessary mechanical elements of the structure such as supports and spacers for the inner vessel and conduits for the conveyance of fluids between the inner vessel and the exterior of the shell.

In the development and production of insulated cryogenic pipe, it is necessary to evaluate the efficiency of the thermal insulation means after it has been installed in the pipe, for it has been found that seemingly small variations in the techniques of providing thermal insulation can produce significant variations in its efficiency.

Probably the most common way of measuring the heat leak into a cryogenic container is by the boil-off method. The container is filled with a liquid cryogen and the heat leak is evaluated by metering the rate of evaporation of the liquid. The heat of vaporization of the cryogen is assumed to be accurately known. The boil-off technique has several shortcomings, three of which become particularly pronounced when the cryogenic container being tested is a long section of cryogenic pipe. First, this technique, without elaborate modifications, yields only an overall heat leak value: the effects of spacers, couplings, etc. are included in the measured heat leak value. Second, and more important, the boil-off technique assumes that all of the heat leak is absorbed by the boiling liquid at constant temperature. Actually there may be more or less sensible heating of the vapor formed before it leaves the inner tube of the pipe. This results in an erroneously low measured heat leak value. Third, in small inside diameter pipes which are mounted vertically, the boiling of the liquid cryogen tends to create geysering which throws liquid out of the pipe into the vapor outlet line.

It is an object of this invention to provide a method and apparatus that can be used for measuring the local heat leak into short sections of a pipe so that the heat leakage through insulation spaces and materials can be measured separately from that through structural and mechanised elements such as spacers, couplings, etc. Or, conversely, the heat leak due specifically to a spacer, coupling, or other single element of structure can be measured separately from that due to other structural elements or general insulation means.

All of the heat that leaks through the insulation must also pass through the outer shell that surrounds the insulation of the pipe, and this invention determines the heat leakage by measurements made on the outside surface of the pipe. This makes posible the obtaining of much more detailed information concerning heat leakage at different locations along the lentgh of the pipe. It may be said, therefore, that another object of the invention is to determine the heat leakage into a pipe by measurements made on the outside of the pipe.

Other objects, features and advantages of the invention will appear or be pointed out as the description proceeds.

In the drawing, forming a part hereof, in which like reference characters indicate corresponding parts in all the views:

FIGURE 2 is a diagrammatic illustration of apparatus for determining heat leakage in accordance with this invention;

FIGURE 7 is an enlarged sectional view taken through a test section of pipe at the location 7—7 of test equipment, but showing a spacer located in the pipe.

Figure 1:
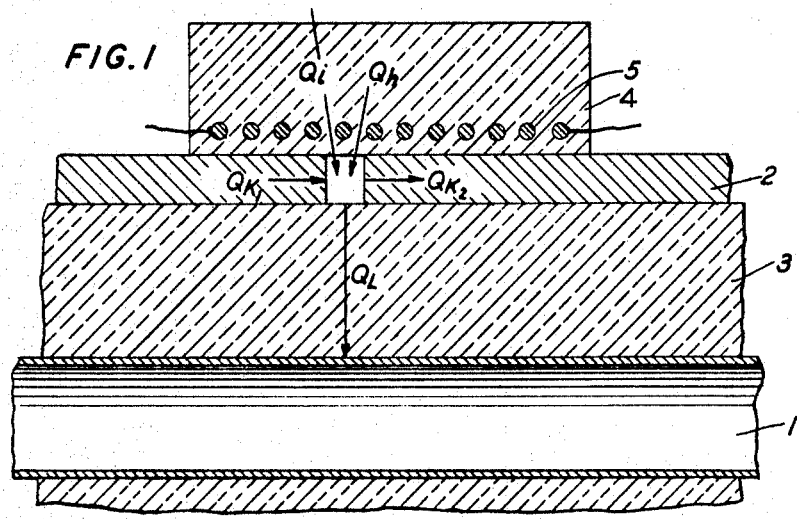
FIGURE 1 is a diagram illustrating the theory of this invention.

The principles involved in measuring cryogenic pipe heat leaks from the outside of the pipe are illustrated by the schematic diagram in FIGURE 1. In FIGURE 1:

(1) is the insulated fluid conduit or inner vessel,
(2) is the rigid outer shell,
(3) is the insulation space which may be filled with an insulating material.

The pipe is in an environment of constant temperature, $\theta_0=0$, and the inner tube of the pipe is filled with liquid nitrogen ($\theta_{N2}<0$). A test section of the pipe (of length L) is isolated from its environment by an exterior jacket of high efficiency insulation 4. An electrical heater 5 is placed along the outer tube wall of the test section so that the wall can be uniformly heated.

Now consider the differential element $dx$ of the outer tube at position $x$. In this element, there are five sources of heat transfer which are shown in FIGURE 1. $Q_{k_1}$ and $Q_{k_2}$ represent the longitudinal conduction along the pipe wall, and their difference, $Q_{kn}=Q_{k1}-Q_{k2}$ represents the net longitudinal conduction into element $dx$. $Q_i$ represents the heat transfer through the exterior insulation between the constant temperature environment and the outer tube wall. $Q_h$ represents the heat supplied to the outer tube wall by the heater. And, $Q_L$ is the radial heat leak through the pipe insulation. At thermal equilibrium, the temperature $\theta$ (X) of the differential element must assume a value such that the following heat balance is satisfied.

$$Q_{kn}+Q_i+Q_h+Q_L=0 \qquad (1)$$

From conventional conduction theory, the net longitudinal conduction along the pipe is given by Equation 2.

$$Q_{kn}=Q_{k1}-Q_{k2}=kA\frac{d^2\theta}{dx^2}dx \qquad (2)$$

where:
$k$=thermal conductivity of the outer tube
$A$=cross-section area of the outer tube wall.

The heat leak through the exterior insulation is according to Equation 3.

$$Q_i=hC\theta \, dx \qquad (3)$$

where:
$h$=surface heat transfer coefficient referred to the surface of the outer tube wall,
$C$=circumference of the outer tube.

The heater input to the differential element is given by Equation 4.

$$Q_h=\frac{P}{L}dx \qquad (4)$$

where:
P=total heat supplied to the test section
L=length of the test section.

The heat transfer through the pipe insulation, $Q_L$, is driven by a very large temperature difference, essentially the difference between the environment temperature and that of the liquid cryogen in the inner tube. $Q_L$ is, then, practically independent of small variations in the temperature of the outer wall. Equation 1, can, therefore, be written as follows:

$$kA\frac{d^2\theta}{dx^2}-hC\theta+\frac{P}{L}=\frac{Q_L}{dx}=q_L \qquad (5)$$

The symbol $q_L$ represents the pipe heat leak per unit length of pipe.

From the differential equation involved, or simply by inspection, one can see that this heat transfer situation is equivalent to the standard case of a thin rod of uniform cross-section, both ends of which are maintained at a constant temperature $\theta$, with uniform heat generation within the rod, and with heat loss from the surface of the rod to an environment at $\theta=0$.

According to Equation 5, the electric heater is not really essential for measuring heat leaks from the outside of the pipe. If $Q_h$ is zero, the temperature of the pipe wall, $\theta$ (X), must fall below the environment temperature to such a degree that the heat leak is supplied by the sum of the net longitudinal conduction along the outer tube wall and the conduction through the exterior insulation. So long as $Q_L$, $hC$, and $kA$ of Equation 5 are uniform throughout the test section, the temperature profile along the outer wall of the test section must show a minimum at the center of the test section and be symmetrical about this center point. In principle, one only needs to measure the temperature at the center of the test section, and by using appropriate values for $hC$ and $kA$, $q_L$ can be calculated directly.

In practice, however, this "no-heat" scheme presents several problems. First, $hC$ has been assumed to be constant throughout the test section. If, in practice, the thickness of the exterior insulation layer is of the same magnitude as its length; considerable end effects will exist. The value of $hC$ is not constant throughout the length of the test section. Second, only the longitudinal heat transfer along the outer tube wall has been accounted for in Equation 5, but some of the common pipe insulations, notably the aluminum foil laminates, exhibit highly anisotropic thermal conductivities. They have quite high longitudinal thermal conductivities. Not only does this possible longitudinal heat transfer within the pipe insulation require an additional term in Equation 5, which is difficult to evaluate, but it also perturbs the equilibrium radial temperature gradient within the insulation.

The introduction of the electrical heater into the test section yields a situation in which neither $hC$ nor $kA$ needs to be known accurately. If $Q_L$ is uniform throughout the test section, the electrical heater power can be adjusted so that the outer wall temperature is uniformly zero ($\theta=\theta_0=0$). Under this condition, $Q_{k1}$, $Q_{k2}$, and $Q_i$ are all zero since there are no thermal gradients for such heat transfer, and $Q_L$ exactly equals $Q_h$. $Q_{kn}$ and $Q_i$ simply serve as heat flow resistances which produce a thermal gradient that is used as the nulling device to determine when $Q_h=Q_L$.

Even if, as is usually the case in practice, $Q_L$ is not quite uniform throughout the test section, the electrical heater power can be adjusted so that the average $\theta$ throughout the test section is approximately zero. The values of $Q_{kn}$ and $Q_i$ are then small corrections to $Q_h$ in Equation 5 from which $q_L$ is determined. Thus, a very accurate knowledge of the values of $hC$ and $kA$ are still not required.

In essence, then, the method proposed here for measuring the heat leak into a cryogenic pipe is one in which a conveniently measurable quantity of electrical heat is made to balance the heat leak.

FIGURE 2 shows apparatus for measuring heat leakage in accordance with this invention. The vessel to be tested consists of a length of cryogenic pipe 15, and the portion along which the heat leakage is to be measured is enclosed in a container 16. The pipe 15 extends through opposite walls of the container 16 and there are seals 18 around the openings through which the pipe passes to prevent leakage of liquid, such as water 20 from the container 16.

The water 20 is maintained at a substantially constant temperature. In the construction illustrated, there are electric heater coils 22 submerged in the water in the container 16 and there are agitators 24 constantly driven by electric motors 26 to circulate the water 20 so that the water is at substantially the same temperature everywhere in the container 16. A heat-responsive controller 28 is in contact with the water 20 and controls the power supply to the heater coils 22 so that the supply of heat is responsive to minute variations in the temperature of the water 20. It will be understood that the temperature of the water 20 can also be controlled by cooling coils, if desired.

The pipe 15, extends in a direction having a vertical component and there is a section of pipe 30 connected with the test pipe 15 by a coupling 32. This test pipe 30 extends upwardly and has an open end 34 which provides a vent at the higher end of the pipe 15. A level control 36 is located in or attached to the pipe section 30 for controlling the level of a cryogenic fluid with which the pipe 15 is filled during the test period.

The low end of the pipe 15 is connected by a coupling 42 with a short section of pipe 44 having its inner portion 46 connected with a cylinder 48 containing liquid nitrogen or other cryogenic fluid. A solenoid-operated valve 50 in the fluid supply line from the cylinder 48 to the pipe section 44 is opened and closed as necessary, in response to operation of the controller 36, to maintain the desired level of liquid nitrogen or other fluid in the piping system during the test period.

A section of the pipe 15 is shown in FIGURE 7. The pipe has an inner shell 54 and an outer shell 56, the latter being concentric with the inner shell 54 but of substantially larger radius so that there is an annular space 58 of substantial radial extent, for holding heat-insulating material 60. Part of the thermal insulation may be provided by reducing the gas pressure in this space to a very low level. The inner shell 54 is held in spaced relation to the outer shell 56 by spacers 62. There are spacers at axially separated locations along the length of the pipe 15.

Referring again to FIGURE 2, the test section of the pipe 15 is located adjacent to a heater 66. In the illustrated construction, the heater 66 consists of a very uniform helical winding of heater wire around the outer shell 56, of the test section of the pipe 15. This heater 66 has conductors 67 and 68 which lead back to a power source, such as a battery 70.

The amount of energy supplied to the heater 66 is regulated by a regulator or rheostat 72 having an adjustable element 74 by which the energy flow can be increased or decreased, as desired. A current indicator 76 is connected across a resistance 77 in series with the conductor 67; and a voltage indicator 78 is connected across the conductors 67 and 68. Thus the energy supplied to the heater 66 is accurately known at all times and can be varied, as desired.

Thermocouples 81-87 are located at axially spaced stations along the test section of the pipe 15. This test section between the thermocouples 81 and 87, is isolated from its surrounding environment (the water bath 20), by an enclosing section of high efficiency heat insulating material 90 which surrounds the test section of pipe 15. The thermocouples 81 and 87 are used to measure the temperature of the outside shell of the pipe 15 at the opposite ends of the test section where the temperature is dependent on the contact of the pipe with the water 20.

The other thermocouples 82-86 are preferably located at evenly spaced stations along the test section and the wires from these thermocouples are brought out through the enclosing section of insulation 90.

Although the thermocouples 81-87 can be connected to the outer shell of the pipe 15 in various ways, they are preferably connected with the pipe by having a copper band 94 (FIGURE 7) which is clamped around the outer shell by a bolt 96, in the manner of a hose clamp. The purpose of these bands is to conduct heat to the thermocouples from a circumferential region of the outer shell instead of making the thermocouples measure only the temperature at the point of connection to the shell.

A potentiometer 98 has terminals 100 which are brought into contact with terminals 81T-87T of the respective thermocouple circuits to determine the temperature at the respective thermocouples.

Figure 3:
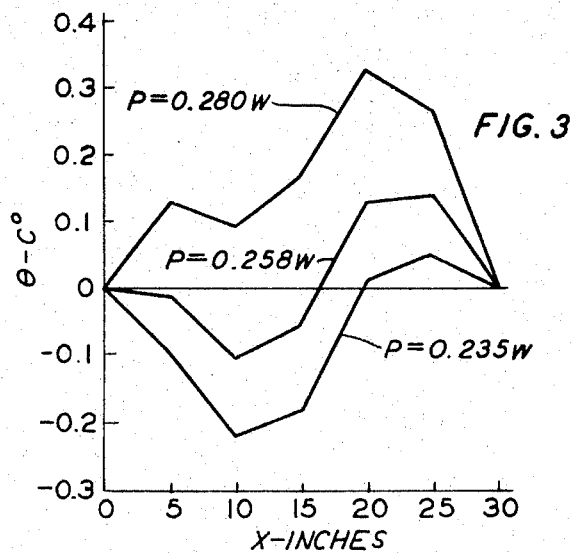
FIGURE 3 is a chart showing test results obtained when operating the apparatus of FIGURE 2 at different rates of power supply to the heater.

In FIGURE 3 is shown data taken on a 30-inch section of 3-inch O.D. cryogenic pipe which was insulated with an experimental laminar insulation. This is a graph of the measured $\theta$ (X) vs. $x$ for several heating rates. One can see that no uniform heating rate could produce $\theta=0$ throughout the test section. This is indicative of a slightly non-uniform pipe insulation.

From such data in which $\theta$ is not exactly zero throughout the test section, the rigorous evaluation of $q_L$ requires an exact solution of Equation 5. The term $P/L$ of Equation 5 is measured directly and presents no difficulties. The term $kAd^2\theta/dx^2$ requires a value of $kA$ and of $d^2\theta/dx^2$. The value of $kA$ can be fairly accurately calculated from the dimensions of the outer tube and published values for $k$. The value of $d^2\theta/dx^2$ at $x_i$ can be reasonably approximated from the measured $\theta_i$ vs. $x_i$ data by the method of finite differences.

$$\left(\frac{d^2\theta}{dx^2}\right)x_i = \frac{\theta_{i+1}-\theta_i}{X_{i+1}-X_i} - \frac{\theta_i-\theta_{i-1}}{X_i-X_{i-1}} \quad (6)$$

The term $hC\theta$ of Equation 5 requires, in addition to the measured $\theta$, a value of $hC$. But $hC$ is not only a function of $x$, but it is also dependent upon the temperature distribution along the test section. An experimental or analytical evaluation of $hC$ is probably possible, but this complication is unnecessary: there is a much simpler method of exactly solving Equation 5.

Figure 4:
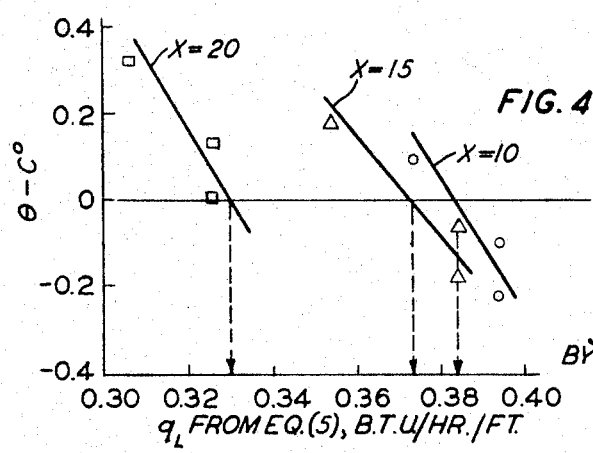
FIGURE 4 is a chart illustrating the method for determining the rates of heat flow at different locations, using the observed results of FIGURE 3.

The terms $P/L$ and $kAd^2\theta/dx^2$ are evaluated as before, but a constant value of $hC$, estimated from the geometry and thermal conductivity of the exterior insulation, is assumed. For particular value of $x$, the values of $qL$ are then calculated from Equation 5, using the data obtained for several different heating rates. These $qL$ values for given $x$ are plotted against the value of $\theta$ for each different heating rate, and a line is drawn through these points. This is shown in FIGURE 4. The use of the consttnt $hC$ value yields values of $qL$ that are not independent of the heating rate. But the value of $qL$ at which the line crosses the $\theta=0$ axis is the solution of Equation 5, for if $\theta=0$ axis is the solution of Equation 5, for if $\theta=0$, then the term $hC\theta$ must also be zero, irrespective of the value of $hC$.

Finally, for those experimental data in which $kAd^2\theta/dx^2$ is small, the experimental data can be very simply interpreted. For each value of $x$, one simply plots $\theta$ vs. $P/L$ for several different heating rates. A line is drawn through these points, and the intercept of this line with the $\theta=0$ axis is, neglecting the $Q_{kn}$ correction, the value of $qL$. This treatment of the data shown in FIGURE 3 is shown in FIGURE 5.

Figure 5:
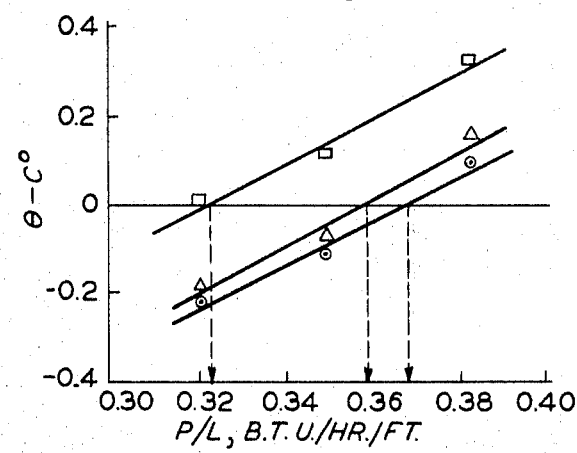
FIGURE 5 is a chart showing a simplified method of treating the data obtained in FIGURE 3.

In Table I, the values of $qL$ obtained from the data shown in FIGURE 3 by the exact method shown in FIGURE 4 are compared with those obtained by the approximate method shown in FIGURE 5. One observes that little error is introduced by the approximate treatment.

TABLE I

Comparison of heat leak values obtained from Equation 5 with those obtained from approximate graphical method (FIGURE 5) using data from FIGURE 3.

| | $q_L$, B.t.u./hr.ft. | |
|---|---|---|
| | Eq. 5 | Approximate graphical method |
| $x$ inches: | | |
| 5 | 0.343 | 0.350 |
| 10 | 0.383 | 0.367 |
| 15 | 0.373 | 0.358 |
| 20 | 0.330 | 0.324 |
| 25 | 0.318 | 0.310 |

By examining over-lapping test sections along a pipe, this method has been found to be precise within about ±6 percent. We believe that the accuracy of this method is about the same as the precision.

Figure 6:
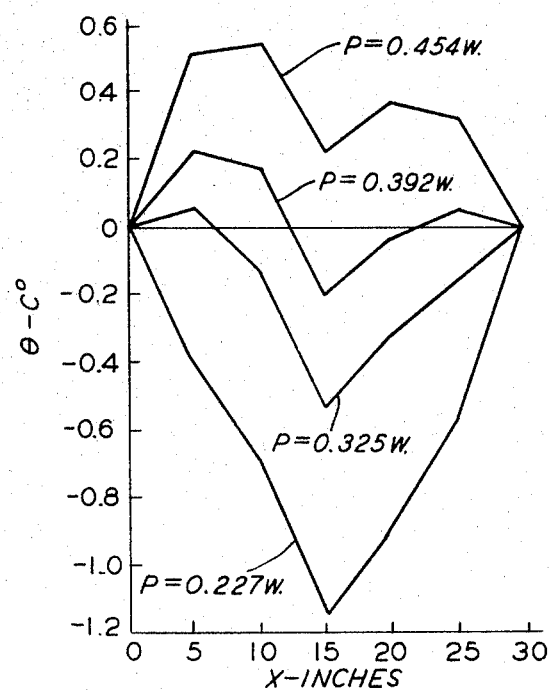
FIGURE 6 is a chart illustrating the variations in the local heat leakage within a test section having a spacer at one location along the length of the test section.

In order to demonstrate the sensitivity of this method in determining variations in the local heat leak within the test section, a test section was investigated that had a spaced located at the center of the secion ($x=15$). The measured $\theta$ (X) values are shown for several heating rates in FIGURE 6. One sees a definite cooler spot in the immediate vicinity of the spacer ($x=15$). The values of $qL$ at points away from the spacer was found to be 0.48 B.t.u./hr./ft. of pipe, and in the immediate vicinity of the spacer it was found to be 0.61 B.t.u./hr./ft. of pipe.

The preferred embodiment of the invention has been illustrated and described, but changes and modifications can be made and some features can be used in different combinations without departing from the invention as defined in the claims.

What is claimed is:

1. Apparatus for determining the heat leakage into a cryogenic vessel including an enclosing section of heat insulation that surrounds the periphery of the length of the vessle that is to be tested, thermocouples on the peripheral surface of the vessel between said surface and the enclosing section of insulation, the thermocouples being spaced from one another axially along the length of the vessel, a heater along the test length of the vessel, means for supplying energy to the heater including a regulator for adjusting the amount of energy supplied to the heater and indicating means for determining the amount of energy supplied for each adjustment of the regulator, other indicating means for determining the temperature at each of the thermocouples, means in contact with the vessel beyond the ends of the enclosing section of insulation for maintaining the surfaces of the vessel, beyond both ends of said enclosing section, at the same temperature.

2. The apparatus described in claim 1 characterized by said means in contact with the vessel beyond both ends of the enclosing section of insulation including a container with a fluid therein, the vessel and at least a part of said enclosing section of insulation being submerged in the fluid, and means for maintaining the fluid at substantially constant temperature.

3. The apparatus described in claim 2 characterized by the container being filled with water and having the same body of water in contact with the vessel beyond both ends of the enclosing section of insulation, and circulating means in the water for maintaining the water in the container in motion so that all parts of the body of water are at substantially the same temperature.

4. The apparatus described in claim 3 characterized by a heater in the water, a temperature controller in the water responsive to the temperature of the water and connected with the heater for controlling the supply of energy to the heater in accordance with variations in the temperature of said water.

5. The apparatus described in claim 4 and wherein the vessel to be tested is a pipe, and characterized by the container having opposite end walls with aligned openings through which the pipe passes into and out of the container, seals at the openings and around the pipe for preventing leakage of water from the container around the pipe, the heater for the pipe being an electric resistance wire wrapped around the length of pipe that is within the enclosing heat insulation, the pipe having heat-conducting bands around its circumference and to which the respective thermocouples are connected to make each thermocouple responsive to the temperature around an angular extent of the circumference of the pipe, means maintaining the pipe filled with cryogenic fluid throughout the length to be tested and beyond, the test length of the pipe extending in a direction having a vertical component, a vent at the higher end of the pipe, fluid inlet supply means at the lower end of the pipe, and a fluid level controller connected with the fluid inlet supply means.

6. The method of determining the heat flow through insulation surrounding a cryogenic vessel, which method comprises maintaining the inside of the vessel at a known and substantially constant low temperature, maintaining the outside of the insulated vessel in an environment of known and substantially constant temperature higher than that inside the vessel, insulating at least part of said outside from the environment, applying heat substantially uniformly to said at least part of the outside of the vessel, controlling the rate of heat supply so that the said at least part of the outside of the vessel is maintained at the temperature of said environment and measuring the said rate to determine the rate of heat leak through the insulation.

7. A method for determining the heat leak through an insulated section having two sides comprising the steps of placing one side of the section to be tested in an environment having a substantially constant temperature, insulating said one side from said environment, maintaining a substantially constant temperature lower than said first temperature on the other side of said section, applying heat substantially uniformly to the said one side of said section, controlling the rate of heat supply so that the average surface tempearture of said one side is maintained at approximately the temperature of said environment, sensing the temperature of said surface of said one side at a plurality of points spaced from one another in order to detect variations in the heat leak through said section, and measuring said rate of heat supply which is substantially equal to the rate of heat leak through the insulated section.

8. A method of determining the heat leak through a section of a cryogenic vessel having inner and outer shells with insulation between the shells comprising the steps of placing the outer shell in an environment having a substantially constant temperature, insulating said outer shell from said environment, maintaining a substantially constant temperature lower than said first temperature on the inner shell of said section by supporting the vessel with its longitudinal axis extending in a direction having a vertical component, supplying cryogenic liquid to the lower end of the vessel, maintaining the level of the liquid in the vessel above the section of the vessel to be tested so that said section is always full of cryogenic liquid, applying heat substantially uniformly to the outer shell of said section, controlling the rate of heat supply so that the surface temperature of said outer shell is maintained at approximately the temperature of said environment and measuring said rate of heat supply which is substantially equal to the rate of heat leak through the insulated section.

9. The method described in claim 12 wherein the vessel is a length of cryogenic pipe having inner and outer shells with heat insulation between the shells, and characterized by filling the inside shell with cryogenic liquid to maintain the low temperature, insulating the space around a part of the length of the outer shell, within the confines of said environment but of shorter length than stid environment, and applying the heat to said part.

References Cited

UNITED STATES PATENTS

| 3,217,538 | 11/1965 | Loeb | 73—190 |
| 3,229,499 | 1/1966 | Shayeson et al. | 73—15 |
| 3,045,473 | 7/1962 | Hager | 73—15 |

FOREIGN PATENTS

| 713,640 | 10/1931 | France. |
| 804,584 | 11/1962 | Russia. |

OTHER REFERENCES

Smirnov, P.M., An Instrument for Determining the Coefficient of Heat Transfer of Fabric, in Bylleten' izobretenity, Nr 8, p. 42 (U.S.S.R.).

RICHARD C. QUEISSER, *Primary Examiner.*

E. D. GILHOVLY, *Assistant Examiner.*

PO-1050
(5/69)

UNITED STATES PATENT OFFICE
CERTIFICATE OF CORRECTION

Patent No. 3,453,865  Dated July 8, 1969

Inventor(s) Edward R. Blanchard and Sydney H. Reiter

It is certified that error appears in the above-identified patent and that said Letters Patent are hereby corrected as shown below:

Column 2, line 25, "posible" should read -- possible --; line 27, "lentgh" should read -- length --; line 58, "(1)" should read -- 1 --; line 59, "(2)" should read -- 2 --; line 60, "(3)" should read -- 3 --.
Column 3, line 31, -- electric -- should be inserted before "heater"; in the Equation, line 46, "hCΘ" should read -- hCO --.
Column 4, line 24, "Qh=$Q_L$" should read -- $Q_h=Q_L$ --.
Column 6, lines 11 and 13, "qL" should read -- $q_L$ --; line 16, "consttnt" should read -- constant --; lines 16 and 17, "qL" should read -- $q_L$ --; line 19, delete "for if Θ=0 axis is the solution of Equation 5,"; lines 27 and 30, "qL" should read -- $q_L$ --; line 38, "Comparison" should read -- Comparisons --; line 58, "secion" should read -- section --; line 62, "qL" should read -- $q_L$ --.
Column 8, line 10, "tempearture" should read -- temperature --; line 38, "12" should read -- 6 --; line 45, "stid" should read -- said --.

SIGNED AND
SEALED

MAR 31 1970

(SEAL)
Attest:

Edward M. Fletcher, Jr.
Attesting Officer

WILLIAM E. SCHUYLER, JR.
Commissioner of Patents